US010949928B1

(12) United States Patent
Roll

(10) Patent No.: US 10,949,928 B1
(45) Date of Patent: *Mar. 16, 2021

(54) SYSTEM AND METHOD FOR OBTAINING AND/OR MAINTAINING INSURANCE COVERAGE

(71) Applicant: STATE FARM MUTUAL AUTOMOBILE INSURANCE COMPANY, Bloomington, IL (US)

(72) Inventor: Leif Agerholm Roll, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,768

(22) Filed: Nov. 11, 2019

Related U.S. Application Data

(63) Continuation of application No. 14/871,401, filed on Sep. 30, 2015, now Pat. No. 10,510,120.
(Continued)

(51) Int. Cl.
*G06Q 40/08* (2012.01)
(52) U.S. Cl.
CPC .................... *G06Q 40/08* (2013.01)
(58) Field of Classification Search
CPC ........ G06Q 10/00; G06Q 20/00; G06Q 30/00; G06Q 40/00; G06Q 40/08
(Continued)

(56) References Cited

U.S. PATENT DOCUMENTS

| 5,794,207 A | 8/1998 | Walker et al. |
| 5,797,134 A | 8/1998 | McMillan et al. |

(Continued)

FOREIGN PATENT DOCUMENTS

| CN | 106663281 A | 5/2017 |
| GB | 2517964 A | 3/2015 |

(Continued)

OTHER PUBLICATIONS

"Insurance, credit scores don't mix", San Gabriel Valley Tribune; West Covina, Calif, ProQuest document Id: 379360090, May 13, 2005.*
(Continued)

*Primary Examiner* — Frantzy Poinvil

(57) ABSTRACT

An intermediary entity may act on behalf of consumers to find policy rates and/or other features that best meet the consumers' insurance requirements and/or preferences. For instance, consumers may give affirmative consent or otherwise opt into a program that provides insurance cost savings or discounts. Based upon an analysis of individual consumer characteristics and/or insurance preferences, each individual consumer may be grouped with other insurance consumers having similar characteristics and/or insurance preferences. The insurance consumer groupings may be offered for sale, such as through an online auction. When a winning bid is accepted, the insurance policies of the consumers may be updated or new policies may be provided and/or presented to individual consumers for their approval, thereby providing consumers with lower cost insurance and/or insurance that is more reflective of actual risk (or lack thereof). The consumer groups may be updated over time and re-auctioned.

19 Claims, 3 Drawing Sheets

Related U.S. Application Data

(60) Provisional application No. 62/199,008, filed on Jul. 30, 2015, provisional application No. 62/189,885, filed on Jul. 8, 2015, provisional application No. 62/104,596, filed on Jan. 16, 2015, provisional application No. 62/060,080, filed on Oct. 6, 2014.

(58) Field of Classification Search
USPC .................................................. 705/3–44
See application file for complete search history.

(56) References Cited

U.S. PATENT DOCUMENTS

| | | | |
|---|---|---|---|
| 6,085,169 | A | 7/2000 | Walker et al. |
| 6,101,484 | A | 8/2000 | Halbert et al. |
| 6,418,415 | B1 | 7/2002 | Walker et al. |
| 7,107,230 | B1 | 9/2006 | Halbert et al. |
| 7,194,427 | B1 | 3/2007 | Van Horn et al. |
| 7,330,826 | B1 | 2/2008 | Porat et al. |
| 7,343,309 | B2 | 3/2008 | Ogawa et al. |
| 7,403,911 | B2 | 7/2008 | Guler et al. |
| 7,490,050 | B2 | 2/2009 | Grover et al. |
| 7,558,752 | B1 | 7/2009 | Ephrati et al. |
| 7,584,124 | B2 | 9/2009 | Porat et al. |
| 7,610,236 | B2 | 10/2009 | Sandholm et al. |
| 7,685,008 | B2 | 3/2010 | McGiffin et al. |
| 7,720,743 | B1 | 5/2010 | Marks |
| 7,797,194 | B1 | 9/2010 | Friss et al. |
| 7,904,378 | B2 | 3/2011 | Ghani et al. |
| 7,937,278 | B1 | 5/2011 | Cripe et al. |
| 7,958,013 | B2 | 6/2011 | Porat et al. |
| 7,979,341 | B2 | 7/2011 | Hanifi |
| 7,996,296 | B2 | 8/2011 | Lange |
| 8,068,475 | B2 | 11/2011 | Iochi et al. |
| 8,095,399 | B2 | 1/2012 | McConnell et al. |
| 8,103,577 | B2 | 1/2012 | Sakaue et al. |
| 8,117,112 | B2 | 2/2012 | Hambrecht et al. |
| 8,126,794 | B2 | 2/2012 | Lange et al. |
| 8,190,454 | B2 * | 5/2012 | Chien ............... G06Q 40/04 705/4 |
| 8,219,423 | B2 | 7/2012 | Hersch |
| 8,251,702 | B2 | 8/2012 | Marks |
| 8,275,640 | B2 | 9/2012 | Jayaram et al. |
| 8,296,191 | B1 | 10/2012 | Foo et al. |
| 8,301,544 | B2 | 10/2012 | Chatter et al. |
| 8,306,869 | B2 | 11/2012 | Ford |
| 8,315,891 | B2 * | 11/2012 | Kendall ............. G06Q 30/02 705/4 |
| 8,332,244 | B1 | 12/2012 | Karam et al. |
| 8,335,701 | B1 | 12/2012 | Syed et al. |
| 8,341,033 | B2 | 12/2012 | Porat et al. |
| 8,433,588 | B2 | 4/2013 | Willis et al. |
| 8,515,777 | B1 | 8/2013 | Rajasenan |
| 8,521,567 | B2 | 8/2013 | Varanasi et al. |
| 8,527,302 | B2 * | 9/2013 | Johnson, Jr. ........ G06Q 30/08 705/4 |
| 8,543,430 | B1 | 9/2013 | Fields et al. |
| 8,545,229 | B2 | 10/2013 | Marks |
| 8,577,699 | B1 | 11/2013 | Diener et al. |
| 8,577,703 | B2 | 11/2013 | McClellan et al. |
| 8,612,266 | B1 | 12/2013 | Ilgenfritz |
| 8,630,916 | B2 | 1/2014 | Walker et al. |
| 8,635,093 | B2 * | 1/2014 | Kendall ............. G06Q 30/02 705/4 |
| 8,666,786 | B1 | 3/2014 | Wirz et al. |
| 8,666,788 | B1 | 3/2014 | Syed |
| 8,706,531 | B1 | 4/2014 | Voigt et al. |
| 8,719,063 | B1 | 5/2014 | Wade et al. |
| 8,738,463 | B2 | 5/2014 | Porat et al. |
| 8,744,881 | B2 * | 6/2014 | Reid .................. G06Q 40/08 705/4 |
| 8,799,125 | B2 | 8/2014 | Schumann, Jr. |
| 8,818,618 | B2 | 8/2014 | Follmer et al. |
| 8,849,803 | B2 | 9/2014 | Grabau et al. |
| 9,037,394 | B2 | 5/2015 | Fernandes et al. |
| 9,053,469 | B1 | 6/2015 | Bohanek et al. |
| 9,269,109 | B2 | 2/2016 | Berg et al. |
| 9,293,042 | B1 | 3/2016 | Wasserman |
| 9,558,598 | B2 | 1/2017 | Doughty et al. |
| 9,715,711 | B1 | 7/2017 | Konrardy et al. |
| 9,849,364 | B2 | 12/2017 | Tran et al. |
| 9,898,759 | B2 | 2/2018 | Khoury |
| 9,940,676 | B1 | 4/2018 | Biemer |
| 9,953,372 | B1 | 4/2018 | Dziabiak et al. |
| 9,972,053 | B2 | 5/2018 | Denning et al. |
| 9,996,882 | B1 | 6/2018 | Manzella et al. |
| 9,996,884 | B2 | 6/2018 | Collopy et al. |
| 10,062,118 | B1 | 8/2018 | Bernstein et al. |
| 10,109,014 | B1 | 10/2018 | Bischoff et al. |
| 10,192,265 | B2 | 1/2019 | Carragher |
| 10,346,925 | B2 | 7/2019 | Perl et al. |
| 10,380,693 | B2 | 8/2019 | Suiter |
| 10,430,883 | B1 | 10/2019 | Bischoff et al. |
| 10,467,703 | B2 | 11/2019 | Olson |
| 10,475,126 | B1 | 11/2019 | Clegg et al. |
| 10,489,798 | B1 | 11/2019 | Madeyski |
| 10,510,120 | B1 | 12/2019 | Roll |
| 10,540,723 | B1 | 1/2020 | Potter et al. |
| 10,664,920 | B1 * | 5/2020 | Roll .................. G06Q 30/08 |
| 10,713,718 | B2 | 7/2020 | Roll et al. |
| 2001/0004204 | A1 | 6/2001 | Mitsuaki |
| 2001/0037281 | A1 | 11/2001 | French et al. |
| 2001/0042041 | A1 | 11/2001 | Moshal et al. |
| 2001/0056396 | A1 | 12/2001 | Goino |
| 2002/0029158 | A1 | 3/2002 | Wolff et al. |
| 2002/0042769 | A1 | 4/2002 | Gujral et al. |
| 2002/0046067 | A1 | 4/2002 | Kraehenbuehl et al. |
| 2002/0111835 | A1 | 8/2002 | Hele et al. |
| 2002/0194033 | A1 | 12/2002 | Huff |
| 2003/0023492 | A1 | 1/2003 | Riordan et al. |
| 2003/0050901 | A1 | 3/2003 | Jester et al. |
| 2003/0069759 | A1 | 4/2003 | Smith |
| 2003/0093355 | A1 | 5/2003 | Issa |
| 2003/0182222 | A1 | 9/2003 | Rotman et al. |
| 2003/0191672 | A1 | 10/2003 | Kendall et al. |
| 2003/0233260 | A1 | 12/2003 | Snell et al. |
| 2003/0236682 | A1 | 12/2003 | Heyer |
| 2003/0236738 | A1 * | 12/2003 | Lange ............... G06Q 30/08 705/37 |
| 2004/0186755 | A1 | 9/2004 | Roche |
| 2005/0055299 | A1 | 3/2005 | Chambers et al. |
| 2005/0071203 | A1 | 3/2005 | Maus |
| 2005/0075910 | A1 | 4/2005 | Solankl et al. |
| 2005/0119580 | A1 | 6/2005 | Eveland |
| 2005/0199580 | A1 | 9/2005 | Yang et al. |
| 2005/0278199 | A1 | 12/2005 | Ghani |
| 2006/0017897 | A1 | 1/2006 | Sato |
| 2006/0041500 | A1 | 2/2006 | Diana et al. |
| 2006/0055037 | A1 | 3/2006 | Park et al. |
| 2006/0136324 | A1 | 6/2006 | Barry et al. |
| 2006/0178979 | A1 * | 8/2006 | Levine ............... G06Q 50/188 705/37 |
| 2006/0241982 | A1 | 10/2006 | Seifert et al. |
| 2006/0253366 | A1 | 11/2006 | Rebibo |
| 2006/0265259 | A1 | 11/2006 | Diana et al. |
| 2007/0288262 | A1 | 12/2007 | Sakaue et al. |
| 2008/0052111 | A1 | 2/2008 | McMenimen et al. |
| 2008/0154694 | A1 | 6/2008 | Litzow et al. |
| 2009/0024419 | A1 | 1/2009 | McClellan et al. |
| 2009/0037228 | A1 * | 2/2009 | Engel ................ G06Q 10/10 705/4 |
| 2009/0055226 | A1 | 2/2009 | Tritz et al. |
| 2009/0099877 | A1 | 4/2009 | Hyde et al. |
| 2009/0171831 | A1 | 7/2009 | Johnson, Jr. et al. |
| 2009/0228308 | A1 * | 9/2009 | Chien ............... G06Q 40/04 705/4 |
| 2009/0254971 | A1 | 10/2009 | Herz et al. |
| 2009/0281840 | A1 * | 11/2009 | Hersch ............... G06Q 40/00 705/4 |
| 2010/0014573 | A1 | 1/2010 | Momtaz et al. |
| 2010/0145735 | A1 | 6/2010 | Kendall et al. |
| 2010/0198658 | A1 | 8/2010 | Marks |
| 2010/0235242 | A1 | 9/2010 | Firminger et al. |
| 2011/0016687 | A1 | 1/2011 | Xia |

(56) References Cited

U.S. PATENT DOCUMENTS

| | | |
|---|---|---|
| 2011/0021369 A1 | 1/2011 | Mhlanga et al. |
| 2011/0022417 A1 | 1/2011 | Rao |
| 2011/0137730 A1 | 6/2011 | McCarney et al. |
| 2011/0161100 A1 | 6/2011 | Peak et al. |
| 2011/0161168 A1 | 6/2011 | Dubnicki |
| 2011/0166875 A1 | 7/2011 | Hayter et al. |
| 2011/0184250 A1 | 7/2011 | Schmidt et al. |
| 2011/0213628 A1 | 9/2011 | Peak et al. |
| 2011/0213693 A1 | 9/2011 | Kendall et al. |
| 2012/0010906 A1 | 1/2012 | Foladare et al. |
| 2012/0016692 A1 | 1/2012 | Jenkins-Robbins |
| 2012/0066007 A1 | 3/2012 | Ferrick et al. |
| 2012/0066009 A1* | 3/2012 | Kendall ............ G06Q 30/02 705/4 |
| 2012/0078698 A1 | 3/2012 | Pappas et al. |
| 2012/0109692 A1 | 5/2012 | Collins et al. |
| 2012/0123806 A1 | 5/2012 | Schumann, Jr. et al. |
| 2012/0123891 A1 | 5/2012 | Patel |
| 2012/0166228 A1 | 6/2012 | Singleton et al. |
| 2012/0179481 A1 | 7/2012 | Patel et al. |
| 2012/0179482 A1 | 7/2012 | Garms et al. |
| 2012/0209743 A1 | 8/2012 | Mesaros |
| 2012/0232935 A1 | 9/2012 | Voccola |
| 2012/0239438 A1 | 9/2012 | Hemmings et al. |
| 2012/0278112 A1 | 11/2012 | Hersch |
| 2012/0323697 A1 | 12/2012 | Marks |
| 2013/0066656 A1 | 3/2013 | Hanson et al. |
| 2013/0090950 A1 | 4/2013 | Rao |
| 2013/0096956 A1 | 4/2013 | Saidel et al. |
| 2013/0117048 A1 | 5/2013 | Bradshaw et al. |
| 2013/0117049 A1 | 5/2013 | Kendall et al. |
| 2013/0151274 A1 | 6/2013 | Bage et al. |
| 2013/0166313 A1 | 6/2013 | Kitfield et al. |
| 2013/0179188 A1 | 7/2013 | Hyde et al. |
| 2013/0304499 A1 | 11/2013 | Rangadass |
| 2013/0311208 A1* | 11/2013 | Lutnick ............ G06Q 40/08 705/4 |
| 2013/0328671 A1 | 12/2013 | McKown et al. |
| 2013/0339065 A1 | 12/2013 | Denning et al. |
| 2014/0033243 A1 | 1/2014 | Chen et al. |
| 2014/0058759 A1 | 2/2014 | Hersch |
| 2014/0067472 A1 | 3/2014 | Mayes et al. |
| 2014/0081670 A1 | 3/2014 | Lim et al. |
| 2014/0136237 A1 | 5/2014 | Anderson et al. |
| 2014/0136443 A1 | 5/2014 | Kinsey, II et al. |
| 2014/0142987 A1 | 5/2014 | Misch et al. |
| 2014/0149148 A1 | 5/2014 | Luciani |
| 2014/0156314 A1 | 6/2014 | Gunn |
| 2014/0164188 A1 | 6/2014 | Zabawa et al. |
| 2014/0172466 A1 | 6/2014 | Kemp et al. |
| 2014/0172469 A1* | 6/2014 | Kendall ............ G06Q 30/02 705/4 |
| 2014/0188525 A1 | 7/2014 | Kendall et al. |
| 2014/0222469 A1 | 8/2014 | Stahl et al. |
| 2014/0244275 A1 | 8/2014 | Parthasarathy |
| 2014/0257863 A1 | 9/2014 | Maastricht et al. |
| 2014/0278577 A1 | 9/2014 | Baum et al. |
| 2014/0358592 A1 | 12/2014 | Wedig et al. |
| 2014/0372151 A1 | 12/2014 | Karamchedu et al. |
| 2015/0016173 A1 | 1/2015 | Liaw |
| 2015/0025917 A1 | 1/2015 | Stempora |
| 2015/0066543 A1 | 3/2015 | Dubens |
| 2015/0066727 A1 | 3/2015 | Wepsic et al. |
| 2015/0066740 A1 | 3/2015 | DiCarlo |
| 2015/0081329 A1 | 3/2015 | Saidel et al. |
| 2015/0100437 A1 | 4/2015 | Guo et al. |
| 2015/0134344 A1 | 5/2015 | Turrentine et al. |
| 2015/0161738 A1 | 6/2015 | Stempora |
| 2015/0170287 A1 | 6/2015 | Tirone et al. |
| 2015/0172894 A1 | 6/2015 | Gabel |
| 2015/0187019 A1 | 7/2015 | Fernandes et al. |
| 2015/0206248 A1 | 7/2015 | Kornweibel et al. |
| 2015/0269681 A1* | 9/2015 | Kalinadhabhotla .... G06Q 30/08 705/4 |
| 2015/0278855 A1 | 10/2015 | Khoury |
| 2015/0294420 A1 | 10/2015 | Hu |
| 2015/0324920 A1 | 11/2015 | Wilson et al. |
| 2016/0034668 A1 | 2/2016 | Rourke et al. |
| 2016/0098788 A1 | 4/2016 | Wang |
| 2016/0203278 A1 | 7/2016 | Shoemaker |
| 2016/0217512 A1 | 7/2016 | Majumdar et al. |
| 2016/0217532 A1 | 7/2016 | Slavin |
| 2016/0260175 A1 | 9/2016 | Rogers |
| 2016/0283962 A1 | 9/2016 | Chan et al. |
| 2016/0283987 A1 | 9/2016 | Nishimura |
| 2016/0314524 A1* | 10/2016 | Trindade de Sousa Monteiro ..... G06Q 30/08 |
| 2016/0335726 A1 | 11/2016 | Bonitz et al. |
| 2016/0371783 A1 | 12/2016 | Lohrmann |
| 2016/0371788 A1 | 12/2016 | Rackley, III et al. |
| 2017/0061084 A1 | 3/2017 | Pandya |
| 2017/0212997 A1 | 7/2017 | Buonfiglio et al. |
| 2018/0225770 A1 | 8/2018 | Rixford |
| 2018/0336640 A1 | 11/2018 | Dziabiak et al. |
| 2019/0220930 A1 | 7/2019 | Clark et al. |

FOREIGN PATENT DOCUMENTS

| | | |
|---|---|---|
| JP | 2001-202473 A | 7/2001 |
| JP | 2012-003297 A | 1/2012 |
| JP | 2014-149882 A | 8/2014 |
| JP | 2016-134148 A | 7/2016 |
| KR | 20010087072 A | 9/2001 |
| KR | 20010091149 A | 10/2001 |
| KR | 20010091174 A | 10/2001 |
| KR | 20010098293 A | 11/2001 |
| KR | 20010104433 A | 11/2001 |
| KR | 20010104473 A | 11/2001 |
| KR | 20020008996 A | 2/2002 |
| KR | 20030016544 A | 3/2003 |
| KR | 101810179 B1 | 12/2017 |
| KR | 101823015 B1 | 1/2018 |
| KR | 20190071065 A | 6/2019 |
| TW | 200903372 A | 1/2009 |
| WO | WO-02/03595 A2 | 1/2002 |
| WO | WO-2017/168883 A1 | 10/2017 |

OTHER PUBLICATIONS

Chamberlain, Art, "The puny giants we all know how big and impressive the banks are: Just check the skyline . . . ", Proquest Id: 437487503,Toronto, Ont. Jun. 29, 1996.*

Douglass, Auction Rate Securities . . . Going Once, Going Twice, New Jersey CPA, Nov.-Dec. 2010.

Fleming et al., Trading Activity and Price Transparency in the Inflation Swap Market, FRBNY Economic Policy Review, May 2013.

Jaffee et al., Catastrophe Insurance, Capital Markets, and Uninsurable Risks, Journal of Risk and Insurance (1986-1998), vol. 64, Issue 2 (1997).

U.S. Appl. No. 14/868,864, Nonfinal Office Action, dated Jun. 10, 2020.

U.S. Appl. No. 14/868,874, Final Office Action, dated Jul. 14, 2020.

U.S. Appl. No. 14/868,874, Nonfinal Office Action, dated Apr. 2, 2020.

U.S. Appl. No. 14/871,170, Nonfinal Office Action, dated Apr. 6, 2020.

U.S. Appl. No. 14/871,230, Nonfinal Office Action, dated Mar. 5, 2020.

U.S. Appl. No. 14/871,273, Notice of Allowance, dated Jul. 1, 2020.

U.S. Appl. No. 14/871,306, Final Office Action, dated Apr. 16, 2020.

U.S. Appl. No. 14/871,341, Nonfinal Office Action, dated Jun. 11, 2020.

U.S. Appl. No. 15/457,705, Nonfinal Office Action, dated Jul. 2, 2020.

U.S. Appl. No. 15/704,339, Final Office Action, dated Jul. 8, 2020.

U.S. Appl. No. 15/704,350, Final Office Action, dated Jul. 9, 2020.

U.S. Appl. No. 15/704,363, Final Office Action, dated May 29, 2020.

(56) References Cited

OTHER PUBLICATIONS

U.S. Appl. No. 15/704,632, Final Office Action, dated May 22, 2020.
U.S. Appl. No. 15/704,632, Nonfinal Office Action, dated Oct. 1, 2019.
U.S. Appl. No. 15/869,685, Notice of Allowance, dated Mar. 5, 2020.
U.S. Appl. No. 15/869,752, Notice of Allowance, dated Apr. 14, 2020.
U.S. Appl. No. 16/853,691, Roll et al., "Blockchain Systems and Methods for Providing Insurance Coverage to Affinity Groups", filed Apr. 20, 2020.
U.S. Appl. No. 16/853,693, Roll et al., "Blockchain Systems and Methods for Providing Insurance Coverage to Affinity Groups", filed Apr. 20, 2020.
U.S. Appl. No. 16/853,699, Roll et al., "Blockchain Systems and Methods for Providing Insurance Coverage to Affinity Groups", filed Apr. 20, 2020.
U.S. Appl. No. 16/853,704, Roll et al., "Blockchain Systems and Methods for Providing Insurance Coverage to Affinity Groups", filed Apr. 20, 2020.
U.S. Appl. No. 16/853,706, Roll et al., "Blockchain Systems and Methods for Providing Insurance Coverage to Affinity Groups", filed Apr. 20, 2020.
U.S. Appl. No. 16/853,711, Roll et al., "Blockchain Systems and Methods for Providing Insurance Coverage to Affinity Groups", filed Apr. 20, 2020.
U.S. Appl. No. 16/892,500, Roll et al., "Risk Mitigation for Affinity Groupings", filed Jun. 4, 2020.
U.S. Appl. No. 16/910,687, Roll et al., "Machine Learning Technologies for Efficiently Obtaining Insurance Coverage", filed Jun. 24, 2020.
U.S. Appl. No. 16/910,695, Roll et al., "Affinity Group Auctions for Reinsurers", filed Jun. 24, 2020.
U.S. Appl. No. 16/910,702, Roll et al., "Systems and Methods for Efficiently Reinsuring Insurance Policies", filed Jun. 24, 2020.
"Free Diagnostics? $29 Service Call?", Greenleaf Mechanical, downloaded from the Internet at: <https://www.greenleafheatingandcooling.com/free-diagnostics-service/> (Jul. 29, 2012).
"Signing Bonus", Wikipedia entry, downloaded from the Internet at: <https://en.wikipedia.org/w/index.php?title=Signing_bonus@oldid=476735612> (2012).
U.S. Appl. No. 14/868,864, Final Office Action, dated Dec. 5, 2019.
U.S. Appl. No. 14/868,874, Final Office Action, dated Dec. 13, 2019.
U.S. Appl. No. 14/868,874, Nonfinal Office Action, dated Sep. 3, 2019.
U.S. Appl. No. 14/871,230, Final Office Action, dated Nov. 25, 2019.
U.S. Appl. No. 14/871,273, Final Office Action, dated Nov. 15, 2019.
U.S. Appl. No. 14/871,306, Final Office Action, dated Aug. 26, 2019.
U.S. Appl. No. 14/871,341, Final Office Action, dated Dec. 26, 2018.
U.S. Appl. No. 14/871,341, Final Office Action, dated Dec. 31, 2019.
U.S. Appl. No. 14/871,401, Notice of Allowance, dated Aug. 12, 2019.
U.S. Appl. No. 15/457,705, Final Office Action, dated Oct. 7, 2019.
U.S. Appl. No. 15/704,339, Nonfinal Office Action, dated Jan. 2, 2020.
U.S. Appl. No. 15/704,350, Nonfinal Office Action, dated Dec. 26, 2019.
U.S. Appl. No. 15/704,363, Nonfinal Office Action, dated Oct. 1, 2019.
U.S. Appl. No. 15/704,632, Nonfinal Office Action, dated Oct. 24, 2019.
U.S. Appl. No. 15/869,685, Nonfinal Office Action, dated Aug. 21, 2019.
U.S. Appl. No. 15/869,752, Nonfinal Office Action, dated Oct. 31, 2019.
U.S. Appl. No. 14/871,170, Final Office Action, dated Jan. 3, 2020.
U.S. Appl. No. 14/868,864, Final Office Action, dated Nov. 16, 2018.
U.S. Appl. No. 14/868,864, Nonfinal Office Action, dated Jun. 11, 2018.
U.S. Appl. No. 14/868,864, Office Action, dated Jun. 11, 2018.
U.S. Appl. No. 14/868,874, Final Office Action, dated Apr. 23, 2019.
U.S. Appl. No. 14/868,874, Nonfinal Office Action, dated Jan. 9, 2019.
U.S. Appl. No. 14/871,170, Final Office Action, dated Apr. 19, 2019.
U.S. Appl. No. 14/871,170, Nonfinal Office Action, dated Sep. 20, 2018.
U.S. Appl. No. 14/871,170, Office Action, dated Sep. 20, 2018.
U.S. Appl. No. 14/871,230, Nonfinal Office Action, dated Jul. 12, 2018.
U.S. Appl. No. 14/871,230, Office Action, dated Jul. 12, 2018.
U.S. Appl. No. 14/871,273, Nonfinal Office Action, dated Apr. 3, 2019.
U.S. Appl. No. 14/871,273, Office Action, dated Aug. 15, 2018.
U.S. Appl. No. 14/871,273, Office Action, dated Feb. 9, 2018.
U.S. Appl. No. 14/871,306, Nonfinal Office Action, dated Apr. 1, 2019.
U.S. Appl. No. 14/871,306, Office Action, dated Aug. 16, 2018.
U.S. Appl. No. 14/871,306, Office Action, dated Dec. 5, 2018.
U.S. Appl. No. 14/871,341, office action, dated Jul. 10, 2018.
U.S. Appl. No. 14/871,401, Final Office Action, dated Jan. 15, 2019.
U.S. Appl. No. 14/871,401, Nonfinal Office Action, dated Jul. 26, 2018.
U.S. Appl. No. 15/457,705, Nonfinal Office Action, dated May 17, 2019.
U.S. Appl. No. 15/457,705, Roll et al., "System and Method for Obtaining and/or Maintaining Insurance Coverage", filed Mar. 13, 2017.
U.S. Appl. No. 15/704,339, Roll et al., "Systems and Methods for Obtaining and/or Maintaining Usage-Based Insurance", filed Sep. 14, 2017.
U.S. Appl. No. 15/704,340, Roll et al., "Systems and Methods for Obtaining and/or Maintaining Insurance for Autonomous Vehicles", filed Sep. 14, 2017.
U.S. Appl. No. 15/704,363, Roll et al., "Systems and Methods for Determining and Providing Insurance to Affinity Groups", filed Sep. 14, 2017.
U.S. Appl. No. 15/704,632, Roll et al., "Systems and Methods for Obtaining and/or Securing Insurance for Affinity Groups", filed Sep. 14, 2017.
U.S. Appl. No. 15/869,685, Roll et al., "Risk Mitigation for Affinity Groupings", filed Jan. 12, 2018.
U.S. Appl. No. 15/869,752, Roll et al., "Blockchain System and Methods for Providing Insurance to Affinity Groups", filed Jan. 12, 2018.
Office Action issued in U.S. Appl. No. 14/871,306 dated Apr. 1, 2019.
U.S. Appl. No. 14/868,864, Nonfinal Office Action, dated Jun. 7, 2019.
U.S. Appl. No. 14/871,170, Nonfinal Office Action, dated Jun. 27, 2019.
U.S. Appl. No. 14/871,230, Nonfinal Office Action, dated May 23, 2019.
Office Action issued in U.S. Appl. No. 14/871,170 dated Jun. 27, 2019.
Office Action issued in U.S. Appl. No. 14/871,230 dated May 23, 2019.
Office Action issued in U.S. Appl. No. 14/871,341 dated Jun. 25, 2019.
"Assessing the Risks of Insuring Reputation Risk", Gatzert et al., Journal of Risk and Insurance, vol. 83, No. 3, 641-679 (2016) (Year 2015).
"Find Reliable Auto Insurance Agencies Online by Comparing Free Quotes!", PR Newswire (Mar. 3, 2017).
"ReviMedia, Inc.; ReviMedia Re-vamps Insurance Quote Website BestQuotes.com", Insurance Business Weekly (Aug. 31, 2014).

(56) References Cited

OTHER PUBLICATIONS

TransUnion Enters Online Auto Insurance Marketplace with the Launch of Quote Exchange, Intenret Wire (May 16, 2016).
"Use Online Auto Insurance Quotes to Review the Best Agencies in Your Area!" PR Newswire (May 6, 2016).
U.S. Appl. No. 14/871,306, Nonfinal Office Action, dated Jan. 8, 2020.

* cited by examiner

SYSTEM AND METHOD FOR OBTAINING AND/OR MAINTAINING INSURANCE COVERAGE

CROSS-REFERENCE TO RELATED APPLICATIONS

This is a continuation of U.S. patent application Ser. No. 14/871,401 filed on Sep. 30, 2015 now U.S. Pat. No. 10,510,120 and entitled "System and Method for Obtaining and/or a Maintaining Insurance Coverage," which claims priority to and the benefit of U.S. Provisional Application No. 62/060,080 filed on Oct. 6, 2014 and entitled "System and Method for Obtaining and/or a Maintaining Insurance Coverage," U.S. Provisional Application No. 62/104,596 filed on Jan. 16, 2015 and entitled "System and Method for Obtaining and/or a Maintaining Insurance Coverage," U.S. Provisional Application No. 62/189,885 filed on Jul. 8, 2015 and entitled "System and Method for Obtaining and/or a Maintaining Insurance Coverage," and U.S. Provisional Application No. 62/199,008 filed on Jul. 30, 2015 and entitled "System and Method for Obtaining and/or a Maintaining Insurance Coverage." The entire disclosure of each of the above-identified applications is hereby incorporated herein by reference.

Additionally, the subject matter of the present application is related to U.S. application Ser. No. 14/868,864, filed Sep. 29, 2015 and entitled "System and Method for Obtaining and/or Maintaining Insurance Coverage" and to U.S. application Ser. No. 14/868,874, filed Sep. 29, 2015 and entitled "System and Method for Obtaining and/or Maintaining Insurance Coverage," the entire disclosures of which are hereby incorporated herein by reference.

FIELD OF THE DISCLOSURE

The present disclosure generally relates to insurance and, more specifically, to systems and methods for obtaining and/or maintaining insurance coverage.

BACKGROUND

Individuals who seek insurance coverage and are sensitive to pricing and product features (e.g., coverage types and/or limits, deductibles, etc.) often expend considerable time and effort in finding insurance providers that best meet their needs. Conventionally, a consumer finds an insurance provider by way of an agent/broker, an aggregator, a comparison web site, general web browsing, etc. Once the consumer obtains an insurance policy from the desired provider, the consumer is typically tied to that provider, and to the rate and product features of the policy offered by the provider, until and unless he or she proactively shops around for a new provider offering a policy with a better rate and/or product features. For example, a consumer might decide to look into the offerings of other insurance providers when the consumer's current policy is up for renewal. Thus, a consumer typically must either spend time and effort looking for better insurance offerings on a recurring basis (e.g., once every six months or annually), or simply renew his or her current policy regardless of whether that policy provides the best rate and/or product features.

SUMMARY

The present embodiments may, inter alia, automatically provide consumers with insurance policies that offer superior rates and/or product features on a continuing basis (e.g., across multiple policy terms), thereby reducing or eliminating the time and/or effort that consumers must spend researching the offerings of different insurance providers, as well as providing consumers with insurance policies that have lower cost and/or are more reflective of a risk score, characteristics, and/or preferences of the consumer as they change over time. The terms "consumer" and "customer" are utilized interchangeably herein, and generally refer to a person who is an insured party or a potential insured party. A consumer or customer may be represented by himself or herself, or may be represented by an agent (e.g., by a spouse, a person who has power of attorney for the consumer or customer, an administrative assistant, etc.).

An intermediary entity may act on behalf of consumers and/or their agents to find policy rates and/or other features that best meet the consumers' insurance requirements and/or preferences. Based upon consumer or customer characteristics and/or insurance preferences, each consumer or customer may be grouped with other insurance consumers or customers that have the same or similar characteristics and/or insurance preferences. The insurance consumer or customer groupings may be based upon demographic information (e.g., gender, birth date, etc.), information about the consumer's property (e.g., a make, model and year of an automobile, etc.), claim and/or accident history of the consumer, risk (or lack thereof) characteristics of the group members, insurance claim expectations of the group members, insurance company ratings, the content and/or availability of telematics data obtained from vehicles and/or mobile devices of the group members, driving behavior, etc. The insurance consumer or customer groupings may be offered for sale to various insurance providers, such as through an online auction. Once a winning bid is accepted, any existing insurance policies of the consumer or customers affiliated with the auctioned group may (or may not) be updated to reflect new insurance policy terms or parameters (e.g., premiums, rates, etc.), discounts, refunds, etc. In some cases, new insurance policies may be provided to one or more consumers (such as when a consumer is an insurance applicant, or when an existing insurance policy is canceled and a new policy is issued in its stead). The consumer or customer groups may be updated (and/or new consumer or customer groups may be created) over time as new or more recent consumer or customer characteristic data and/or preference information is collected and/or updated. Then the insurance policies associated with the updated (or new) consumer or customer groups may be re-auctioned (or auctioned).

In one aspect, a computer-implemented method includes: (1) analyzing, via one or more processors, multiple insurance applications, accounts, and/or policies for at least one of preferences or characteristics of multiple individuals and/or consumers corresponding to the multiple insurance applications, accounts, and/or policies, wherein the at least one of the preferences or characteristics of the multiple individuals and/or consumers includes a risk score of a particular insured, the risk score stored in a consumer profile of the particular insured; (2) detecting an event, or lack thereof, that impacts the risk score of the particular insured, wherein detecting the event comprises analyzing, via the one or more processors, telematics data collected by a mobile device of the particular insured; (3) updating, via the one or more processors, the risk score of the particular insured based on the analyzed telematics data; (4) dividing or segmenting, via the one or more processors, the multiple individuals and/or consumers into multiple insurance policy groups or segments based upon the at least one of preferences or characteristics of the multiple individuals and/or consumers; (5) auctioning, via the one or more processors and by using an electronic or communications network, an opportunity to provide insurance for one or more of the multiple insurance policy groups or segments; (6) receiving, via the one or more processors and the electronic or communications network, one or more bids for purchase and/or offers of insurance for the one or more of the multiple insurance policy groups or segments; and (7) accepting, via the one or more processors, one of the bids for purchase and/or insurance offers for the one or more of the multiple insurance policy groups or segments.

In another aspect, a system includes a persistent memory storing a consumer profile database, one or more communication interfaces configured to communicate with remote devices via one or more electronic or communications networks, one or more processors, and one or more non-transitory, computer-readable media. The one or more non-transitory, computer-readable media store instructions that, when executed by the one or more processors, cause the system to: (1) analyze consumer profiles that are included in the consumer profile database and that correspond to multiple insurance consumers for at least one of preferences or characteristics of the multiple insurance consumers, wherein the at least one of the preferences or characteristics of the multiple individuals and/or consumers includes a risk score of a particular insured, the risk score in a consumer profile of the particular insured; (2) detect an event, or lack thereof, that impacts the risk score of the particular insured, wherein detecting the event comprises analyzing, via the one or more processors, telematics data collected by a mobile device of the particular insured; (3) update, via the one or more processors, the risk score of the particular insured based on the analyzed telematics data; (4) divide or segment the multiple insurance consumers into multiple insurance policy groups or groupings based upon the at least one of the preferences or characteristics of the multiple insurance consumers; (5) auction, via the one or more electronic or communications network and by using the one or more communication interfaces, an opportunity to provide insurance for one or more of the multiple insurance policy groups or groupings; (6) receive, at the one or more communication interfaces, one or more bids for purchase and/or offers for insurance for the one or more of the multiple insurance policy groups or groupings; and (7) accept one of the bids for purchase and/or offers for insurance for the one or more of the multiple insurance policy groups or groupings.

In another aspect, a system includes a persistent memory storing a consumer profile database, one or more communication interfaces configured to communicate with remote devices via one or more electronic or communications networks, one or more processors, and one or more non-transitory, computer-readable media. The one or more non-transitory, computer-readable media stores instructions that, when executed by the one or more processors, cause the system to: (1) analyze consumer profiles that are included in the consumer profile database and that correspond to multiple insurance consumers for at least one of preferences or characteristics of the multiple insurance consumers, wherein the at least one of preferences or characteristics of the multiple individuals and/or consumers includes a risk score of a particular insured, the risk score stored in a consumer profile of the particular insured; (2) detect an event, or lack thereof, that impacts the risk score of the particular insured, wherein detecting the event comprises analyzing, via the one or more processors, telematics data collected by a mobile device of the particular insured; (3) update the risk score of the particular insured based on the analyzed telematics data; (4) divide or segment the multiple insurance consumers into multiple insurance policy groups or groupings based upon the at least one of the preferences or characteristics of the multiple insurance consumers; and (5) auction, via the one or more electronic or communications network and by using the one or more communication interfaces, an opportunity to provide insurance for one or more of the multiple insurance policy groups or groupings.

With the present embodiments, a customer may first opt into a program (such as an insurance rewards or discount program) or agreement (e.g., one offered by an intermediary entity such as the entity associated with computing system 14 of FIG. 1), and willingly share his or her personal data (and/or vehicle data, health data, mobile device data, etc.) for purposes of obtaining insurance coverage (and/or insurance discounts). In return, the customer may obtain one or more benefits that may be provided by various embodiments described herein, such as superior insurance rates/terms, and/or automatic renewal (or change) of insurance policies with little or no effort by the customer, for example. In some embodiments, customers who opt in may also receive other benefits, such as insurance discounts or rewards, or additional insurance coverage, for example.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
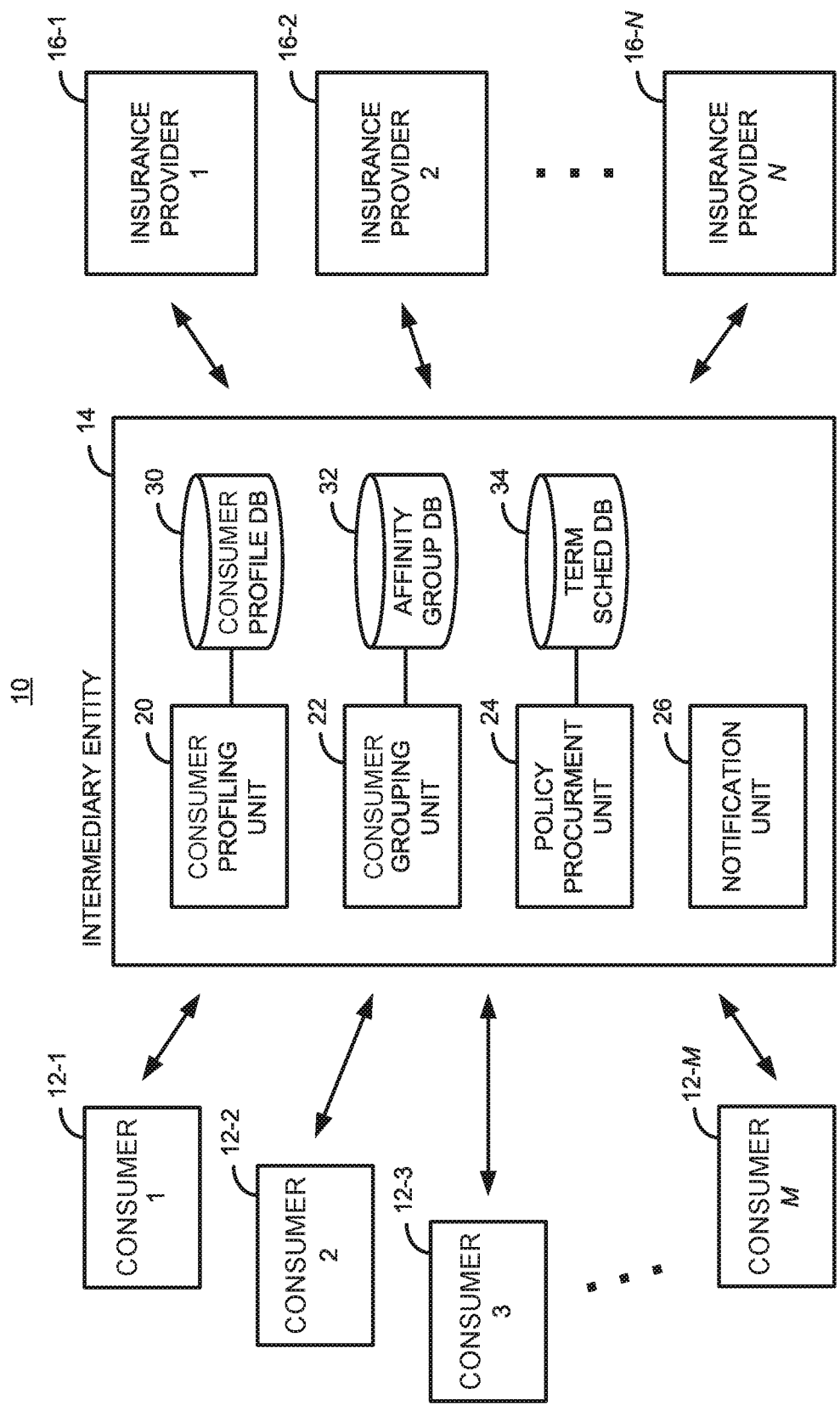
FIG. 1 depicts an exemplary environment including components associated with obtaining and/or maintaining insurance coverage, according to one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

I. Exemplary Automatic Procurement and Maintenance of Insurance Coverage

The present embodiments relate to, inter alia, obtaining and/or maintaining insurance coverage with insurance policies having advantageous rates and/or product features. The insurance policies may be policies for any type of insurance, such as automobile or other vehicle insurance, home or condominium insurance, personal property insurance or life insurance, health insurance, pet insurance, burial insurance, for example.

In some embodiments, an intermediary entity may act on behalf of consumers to find policy rates and/or other features that best meet the consumers' insurance requirements and/or preferences. Initially, each consumer may access an application form (e.g., an on-line form) and enter information relevant to the availability and/or pricing of the consumer's desired insurance policy, such as demographic information (e.g., gender, birth date, etc.), information about the consumer's property (e.g., a make, model and year of an automobile, etc.), claim and/or accident history of the consumer, and so on. Based upon the entered information, the consumer may be grouped together with one or more other consumers in an "affinity group." The affinity group may be defined by any suitable criterion or criteria, such as insurance provider requirements and/or classifications, behavioral and/or attitudinal segmentation, member requirements and/or preferences, etc. To provide just a few more specific examples, the affinity group may be defined by the occupation of the group members, risk characteristics of the group members (e.g., as is typically determined during the underwriting process), insurance claim expectations of the group members (e.g., based upon past claim history and/or risk characteristics), insurance company ratings required or preferred by the group members (e.g., AAA), the content and/or availability of telematics data obtained from vehicles of the group members, etc. An affinity group may be established any time that two or more members are identified as meeting the group requirements, or may be established only when some higher threshold number of members (e.g., 100 members, 1,000 members, etc.) has been met, for example.

Once an affinity group has been established, the intermediary entity may present information about the affinity group members to a number of insurance providers/carriers, along with a request for insurance coverage quotes. The intermediary entity may hold an auction within a particular time period or window of time, for example. During the auction, the participating insurance providers may be permitted to bid on providing insurance for the affinity group. The insurance provider that "wins" by bidding the lowest price/rate (given the profile of the affinity group members), or more generally, in some embodiments, by bidding to provide a policy that aligns most closely with the requirements and/or preferences of the group members, may be chosen to provide the insurance to the members of the affinity group for a specified time period or term (e.g., six months). During that time period, the winning insurance provider may directly handle claims and other inquiries from the members of the affinity group (e.g., on-line and/or via a dedicated call center), and the members of the affinity group may have their checking accounts, credit cards, and/or other fund sources automatically debited (e.g., periodically) by the winning insurance provider in order to pay for the insurance coverage.

In some embodiments, the intermediary entity may, prior to the conclusion of each of one or more policy terms for the affinity group members, automatically conduct another auction for the affinity group. In this manner, the affinity group members may continually receive the most competitively priced insurance coverage (and/or the insurance with the best product features), with little or no additional effort by the group members. Some of the benefits and/or pricing discounts earned by group members, such as loyalty or accident-free discounts, may become a part of the profile of the affinity group, and may be priced into the future costs of the affinity group's insurance coverage. If a member of the affinity group has a driving violation or accident, the member may be moved to a different affinity group to which the member better aligns (e.g., to an affinity group with more similar risk characteristics and/or insurance claim expectations, etc.) for future auctions. The intermediary entity may conduct insurance coverage auctions for a number of different affinity groups. The intermediary entity may form new groups, rearrange existing groups, and/or shop groups to insurance providers on a periodic (e.g., daily) basis, or on any other suitable basis.

In some embodiments, the intermediary entity may instead (or additionally) obtain insurance policies for consumers on an individual basis. For example, the intermediary entity may use a consumer profile (e.g., containing information that was entered in an on-line or other application form, claim information, telematics data, etc.) to automatically seek out an insurance company providing a policy that best meets the pricing and/or product feature requirements and/or preferences of the consumer. The intermediary entity may automatically perform this process when the consumer first obtains a policy and/or each time that the consumer's current policy is up for renewal. In these embodiments, the intermediary entity may seek the best insurance provider/policy each term (e.g., each six months) without conducting auctions. For example, the intermediary entity may instead request a single quote from each of multiple insurance providers each time that a current policy term is drawing to a close, and select the provider with the "best" (e.g., lowest price) quote for the next term without entertaining a second round of bids.

The intermediary entity may obtain revenue in various different ways according to different embodiments. For example, the insurance provider that offers a winning bid in an auction might pay the intermediary entity a flat administrative fee, and/or a commission that includes a percentage of the insurance premium(s) for the affinity group. Alternatively, or additionally, each member of the affinity group might pay the intermediary entity an annual membership fee.

By using one or more of the techniques described above, consumers may be able to obtain insurance coverage at the most competitive price available, on a continuing basis and without the hassles of shopping for insurance on their own. Moreover, participating insurance providers may be able to attract larger groups of consumers, including those who otherwise may not have considered those providers for their insurance needs.

II. Exemplary Environment for Automatically Obtaining and Maintaining Insurance Coverage FIG. 1 depicts an example environment 10 including components associated with obtaining and/or maintaining insurance coverage, according to an embodiment. As illustrated in FIG. 1, the environment 10 may include M computing devices 12-1 through 12-M associated with M respective consumers (e.g., thousands of consumers, millions of consumers, etc.). Each of the computing devices 12-1 through 12-M may be any suitable type of computing device having wired and/or wireless communication capabilities, such as a personal computer, tablet, phablet, smartphone, etc.

The environment 10 may also include a computing system 14 associated with an intermediary entity. The computing system 14 may include one or more servers of the intermediary entity, or may include a plurality of networked computing devices that have an appearance of a single, logical computing device or system, e.g., a group of cloud computing devices. The computing system 14 may be communicatively coupled to computing devices 12-1 through 12-M via a network (not shown in FIG. 1). The network may be a single communication network, or may include multiple communication networks of one or more types (e.g., one or more wired and/or wireless local area networks (LANs), and/or one or more wired and/or wireless wide area networks (WANs) such as the Internet), for example.

The environment 10 may also include computing systems 16-1 through 16-N associated with N respective insurance providers (e.g., two insurance providers, five insurance providers, etc.). Each of the computing systems 16-1 through 16-N may include one or more servers or computing devices of the respective insurance provider, and may be communicatively coupled to computing system 14 via a network (not shown in FIG. 1). The network may be a single communication network, or may include multiple communication networks of one or more types (e.g., one or more wired and/or wireless LANs, and/or one or more wired and/or wireless WANs such as the Internet), for example. Each of the insurance providers 16-1 through 16-N may be a company providing a particular type or types of insurance, such as automobile or other vehicle insurance, home or condominium insurance, personal property insurance and/or life insurance, for example.

The computing system 14 may include various units, including a consumer profiling unit 20, a consumer grouping unit 22, a policy procurement unit 24 and a notification unit 26. Each of some or all of the units 20, 22, 24 and 26 may be (or may include) a respective set of one or more computing devices or processors that executes software instructions to perform the corresponding functions described herein. Alternatively, each of some or all of the units 20, 22, 24 and 26 may be or include a respective component of software that is stored on one or more computer-readable media (e.g., a random access memory (RAM) and/or read-only memory (ROM) of the computing system 14) and executed by one or more processors of the computing system 14 to perform the corresponding functions described herein. Further, one or more of the units may be combined into a single unit, or may be omitted. In various different embodiments, for example, the computing system 14 does not include consumer grouping unit 22 and/or notification unit 26.

Generally, in one embodiment, consumer profiling unit 20 collects information regarding the consumers operating computing devices 12-1 through 12-M (with consumer permission or affirmative consent, or otherwise after a consumer opts into an insurance discount or other online program), and stores the collected information in a consumer or customer profile database 30 that includes a separate profile for each consumer. The consumer or customer profile database 30 may be any suitable type of persistent memory. Consumer profiling unit 20 may obtain the information in any of one or more ways. For example, consumer profiling unit 20 may obtain demographic information (e.g., gender, birth date) and information about consumers' properties (e.g., makes, models and years of automobiles, etc.) via on-line forms (e.g., insurance applications and/or reviews) filled out by the consumers using computing devices 12-1 through 12-M. The consumer profiling unit 20 may provide the on-line forms as one or more web pages (e.g., HTML files, JavaServer Pages files, etc.) stored in a memory of the computing system 14, and the consumers may use web browser applications executing on the computing devices 12-1 through 12-M to access the web page(s), for example. Via the on-line forms, or via other suitable means, consumer profiling unit 20 may also collect insurance preferences and/or requirements of the various consumers. For example, each consumer may enter his or her preferred or required coverage types, coverage limits, deductibles, insurance provider ratings (e.g., AAA), and/or any other preference or requirement relating to insurance. A consumer may indicate that he or she prefers to have a policy through an insurance company that offers live insurance agents, for example. In an alternative embodiment and/or scenario, some or all of the consumers provide information via physical application forms, and some or all of the computing devices 12-1 through 12-M may be omitted in the example environment 10. Generally, the customer profiling unit 20 may store the individual preferences of a particular customer consumer (or indications thereof) in a respective customer profile of the customer profile database 30.

Further, consumer profiling unit 20 may collect other information that is also to be stored in consumer profile database 30 (with customer permission). For a consumer already having an insurance policy with an insurance provider (e.g., one of the insurance providers associated with computing systems 16-1 through 16-N), for example, consumer profiling unit 20 may receive or obtain information from the consumer's insurance account and/or policy. For example, claims information from that provider (e.g., number and/or dates of past claims, past claim payouts made to or on behalf of the consumer, etc.) may be obtained. Alternatively, or additionally, consumer profiling unit 20 may receive telematics data indicative of a consumer's driving performance (e.g., acceleration data, braking data, cornering data, etc.). Generally, the customer profiling unit 20 may store individual characteristics of a particular customer or consumer (or indications thereof) in a respective customer profile within the customer profile database 30. Individual customer characteristics may include, for example, age, account status (for customers who have insurance policies that are in force), marital status, education level, occupation, finances or income, driving history, accident history, vehicle type, home type, geographical location, risk score, driving behavior, and/or other individual customer characteristics.

Consumer grouping unit 22 may utilize at least some of the consumer information stored in consumer profile database 30 (with customer permission) to form one or more affinity groups, and store indications of which of the consumers belong to which affinity groups in an affinity group database 32. The affinity group database 32 may be any suitable type of persistent memory (e.g., the same memory storing consumer profile database 30). Consumer grouping unit 22 may place the consumers into the affinity group(s) based upon the criteria of the groups, which may reflect consumer preferences and/or requirements, insurance provider requirements and/or classifications, and/or behavioral and/or attitudinal segmentation of consumers (e.g., as determined using telematics data indicating driving performance/behaviors), for example.

Policy procurement unit 24 may conduct an automated auction in order to obtain insurance policies for the members of each of the one or more affinity groups. For a given affinity group, policy procurement unit 24 may send information defining the group membership criteria, and/or information about the individual members (e.g., profile information stored in consumer profile database 30), to each of the insurance provider computing systems 16-1 through 16-M, along with a request for insurance premium quotes. After analyzing the information, one or more of the insurance providers may decide to bid on the provision of insurance to the affinity group, and policy procurement unit 24 may receive the bid(s) from the respective ones of insurance provider computing systems 16-1 through 16-M. Policy procurement unit 24 may send each received bid to all others of the insurance provider computing systems 16-1 through 16-M, and bidding may continue in an iterative fashion until auction termination criteria have been met (e.g., until a predetermined amount of time elapses, or until a predetermined amount of time since the last bid elapses, etc.). The insurance provider having the best bid (e.g., lowest price and/or best non-price features) at the time the auction terminates may be granted the ability to provide insurance policies to the members of the affinity group—which may be subject to individual member approval.

The intermediary entity may be authorized to enter a binding contract for the policy/policies on behalf of the consumers, or may require some confirmation or election by the members of the affinity group. If a contract is automatically established via by the agency of the intermediary entity, notification unit 26 may cause the members of the affinity group to be informed of the new insurance provider and the new policy (e.g., by email, letter, etc.). If consumer confirmation or election is required, notification unit 26 may instead cause the members of the affinity group to be sent an indication of the best offer or offers and the corresponding providers, along with a request for confirmation or election. Policy procurement unit 24 may then form the contract with the winning insurance provider after the confirmation or election, for example.

In some embodiments, policy procurement unit 24 may also be responsible for renewing existing insurance policies, or switching to (and/or offering to do so for the customer) a new provider and policy if a better rate and/or other policy features can be found. For example, policy procurement unit 24 may store policy term data for all procured policies in a term schedule database 34 (which may be any suitable type of persistent memory, such as the memory storing consumer profile database 30 and/or affinity group database 32), and may access term schedule database 34 to detect when policy terms are nearing their end (e.g., one month before expiration, or one week before expiration, etc.). When policy terms are nearing their end for the members of an affinity group, policy procurement unit 24 may conduct a new auction among the insurance providers (possibly including more, fewer and/or different providers than had participated in the previous auction), and a new winning provider may be identified. If the winning provider is the same as the current provider, the policies may simply be renewed. Again, notification unit 26 may cause the members of the affinity group to be notified of the renewal (or to be notified of the switch to a new provider), or may first request confirmation or an election from the members. In some embodiments, the affinity group may be reviewed and/or adjusted (e.g., members added and/or removed) by consumer grouping unit 22 prior to each auction, to help ensure that the affinity group criteria continue to be met by all of its members.

In some embodiments and/or scenarios, all members of a single affinity group are provided with policies that have identical start and stop dates. In other embodiments and/or scenarios, at least some of the members may be provided with policies having different start and/or stop dates (e.g., based upon requested start and/or stop dates stored in the consumer profile database 30, etc.).

In some embodiments, consumer grouping unit 22 is omitted, and the computing system 14 only attempts to obtain insurance coverage for consumers on an individual basis. In one such embodiment, policy procurement unit 24 may obtain the best rate for each consumer not by conducting an auction, but rather by automatically requesting a single quote from each of the insurance providers, and taking the best quote (e.g., the lowest premium, and/or a quote with other features best matching the consumer's preferences and/or requirements). Similar to the auction embodiments described above, policy procurement unit 24 may detect when a renewal time is approaching, and automatically request a new round of quotes from the insurance providers at that time to determine whether to renew the consumer's current policy or to initiate a new policy with a new provider. Notification unit 26 may simply notify the consumer of the policy and provider for each upcoming term, or may first request confirmation or election of a particular policy/provider.

Figure 2:
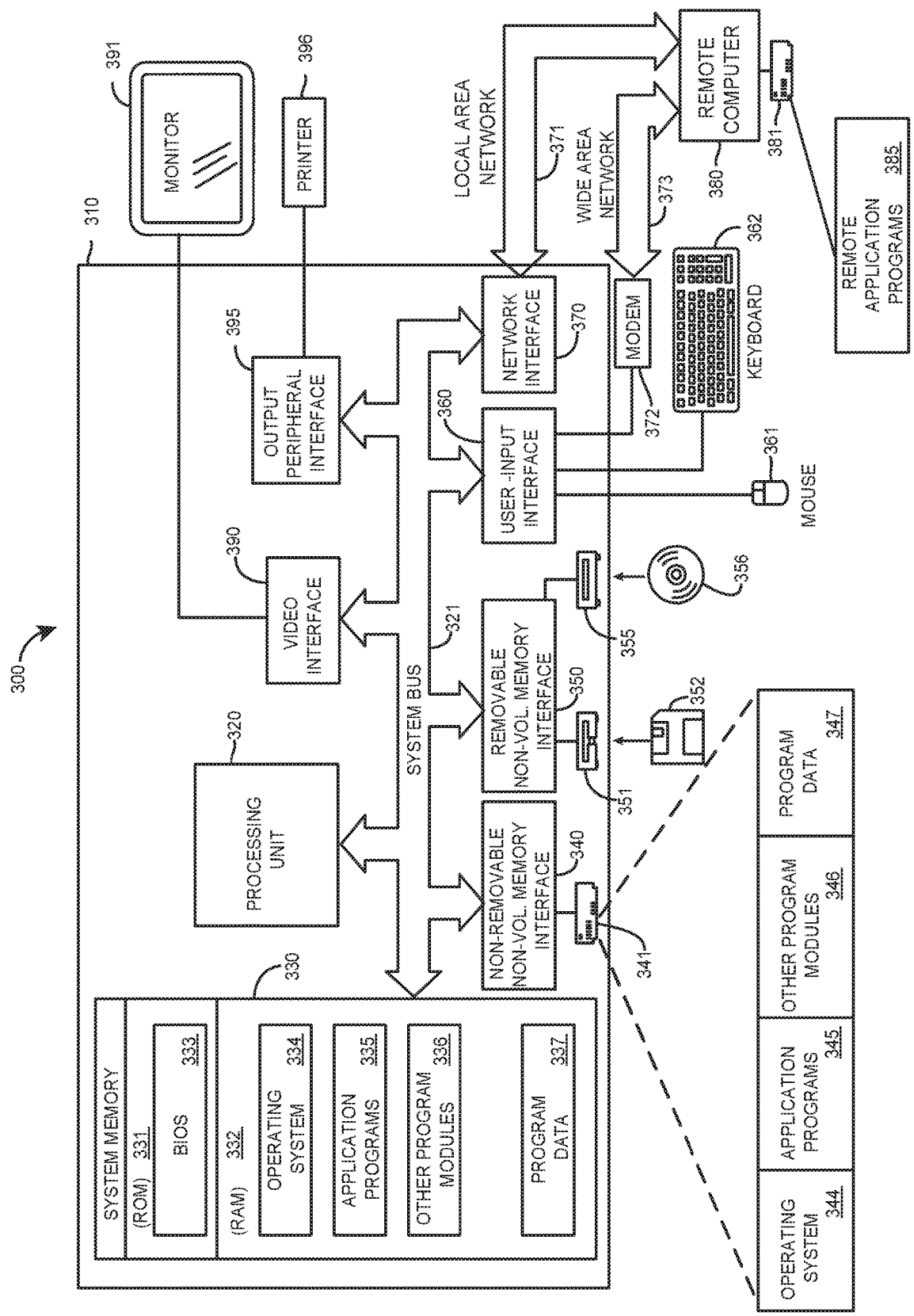
FIG. 2 depicts an exemplary computer system in which the techniques described herein may be implemented, according to one embodiment.

III. Exemplary Computer System for Automatically Obtaining and/or Maintaining Insurance Coverage FIG. 2 depicts an example computer system 300 in which the techniques described herein may be implemented, according to an embodiment. In one embodiment, the computer system 300 may be included in the system 10 of FIG. 1. For example, any one or more of the units 20-26 may comprise one or more instances of the computer system 300, or the intermediary entity 14 may comprise one or more instances of the computer system 300. The computer system 300 of FIG. 2 includes a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 typically includes a variety of computer-readable media. Computer-readable media can be any available media that can be accessed by computer 310 and includes both volatile and nonvolatile media, and both removable and non-removable media. By way of example, and not limitation, computer-readable media may comprise computer storage media and communication media. Computer storage media includes tangible, volatile and nonvolatile, removable and non-removable media implemented in any method or technology for non-transitory storage of information such as computer-readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 2 illustrates operating system 334, application programs 335, other program modules 336, and program data 337.

The computer 310 may also include other removable/non-removable, volatile/nonvolatile computer storage media. By way of example only, FIG. 2 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 2 provide storage of computer-readable instructions, data structures, program modules and other data for the computer 310. In FIG. 2, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 2. The logical connections depicted in FIG. 2 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 2 illustrates remote application programs 385 as residing on memory device 381.

In some configurations, the computer 310 may be included in a plurality of networked computers or computing devices that have the logical appearance as a single, integral computing node, e.g., a cloud computing system. For example, the application programs 345, other program modules 346 and/or program data 337 may be stored in and executed by the logical, single computing node.

The techniques for automatically obtaining and/or maintaining insurance coverage described above may be implemented in part or in their entirety within a computer system such as the computer system 300 illustrated in FIG. 2. The computer 310 may be a server or computing device of an intermediary entity (e.g., within the computing system 14 of FIG. 1), and the remote computer 380 may be a server or computing device of an insurance provider (e.g., within one of the computing systems 16-1 through 16-N of FIG. 1), for example. In some such embodiments, the LAN 371 may be omitted (e.g., communications may between computer 310 and computer 380 may only occur via WAN 373). Application programs 335 and 345 may include programs that implement accepting customer opt-in, consumer profiling unit 20, consumer grouping unit 22, policy procurement unit 24 and/or notification unit 26 of FIG. 1, for example. Consumer profile database 30, affinity group database 32 and/or term schedule database 34 may be stored on hard disk drive 341, magnetic disk 352 or optical disk 356, for example.

In operation, the computer 310 may receive customer affirmative consent via the Internet; demographic, property, preference and/or other information from consumer computing devices (not shown in FIG. 2); form affinity groups based upon that information; provide the remote computer 380 (and one or more other, similar computers of other insurance providers) at least some of the consumer information along with a request for bids; and/or receive bids from the remote computer 380 (and/or from one or more other, similar computers of other insurance providers). The computer 310 may then determine the winning bid and notify the consumers in the affinity group by sending messages (e.g., emails) to the appropriate consumer computing devices, for example.

IV. Exemplary Computer-Implemented Method

Figure 3:
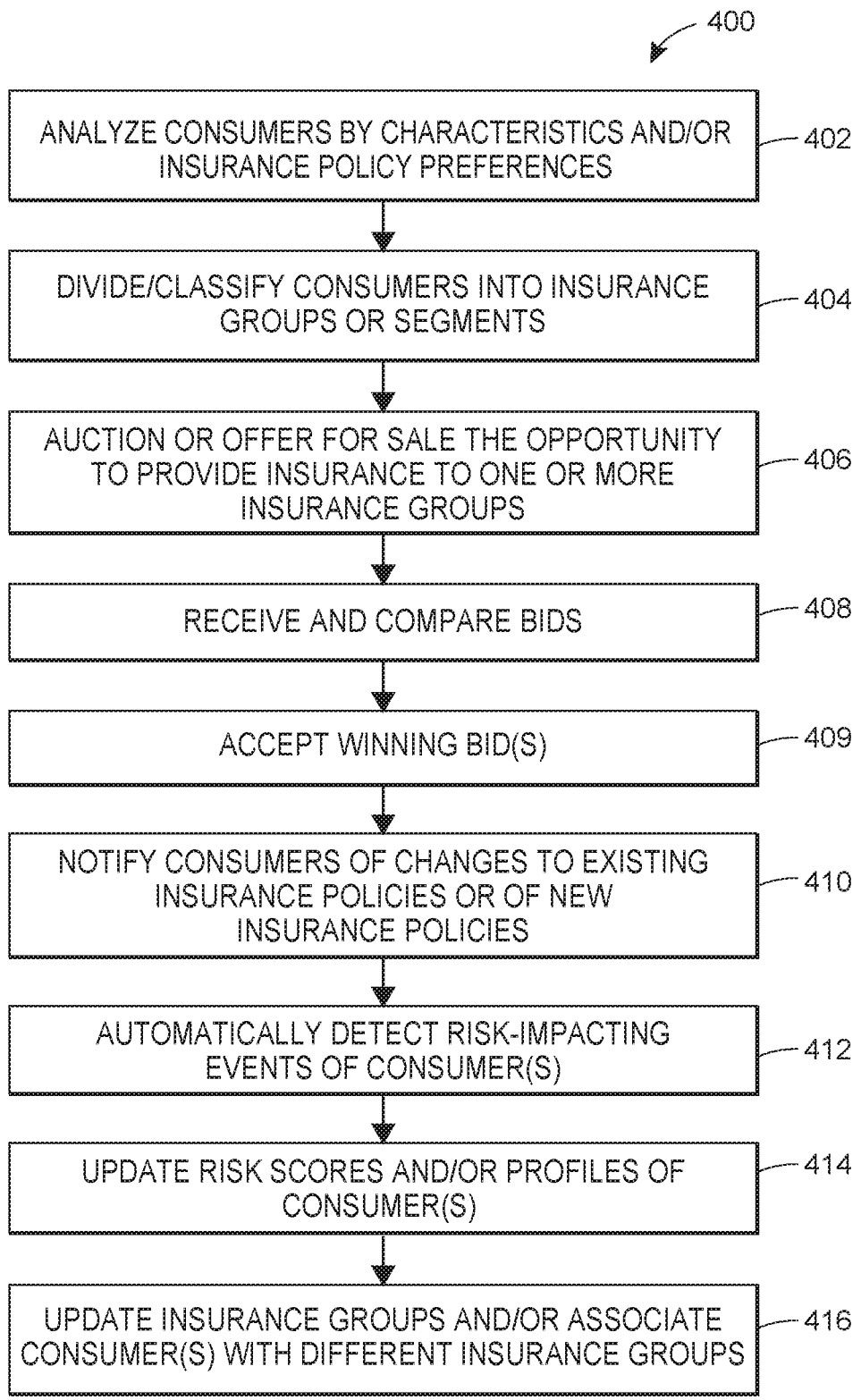
FIG. 3 depicts an exemplary computer-implemented method of auctioning groups or bundles of insurance policies.

FIG. 3 illustrates an exemplary computer-implemented method, e.g., for auctioning groups of insurance policies 400 or providing insurance to groups of consumers or customers. In one embodiment, at least a portion of the method 400 may be performed by the system 10 of FIG. 1 and/or by the computer system 300 of FIG. 2. The method 400 may include, via one or more processors, computing devices, or servers: receiving customer opt-in to a discount or other program, or affirmative consent; analyzing a set of insurance customers by their individual characteristics and/or insurance policy preferences 402; dividing and/or classifying the set of insurance customers into groups or segments based upon the customers' individual characteristics and/or preferences 404; auctioning or offering for sale the opportunity to provide insurance to one or more groups 406; receiving and comparing one or more bids 408; accepting one or more winning bids 409; notifying insurance customers of new insurance policies and/or changes to existing insurance policies, premiums, discounts, etc. 410 (and/or accepting or receiving customer approval of new policies, such as via wireless communication with their mobile devices); automatically detecting driving events or other events that may impact a risk score and/or a customer profile of a customer associated with a particular insurance group or segment 412; updating the customer's risk score or profile 414; and/or updating the particular insurance group or segment with which the customer is associated, and/or moving the customer to be associated with another group or segment 416. After a number of customers have been moved to new or different groups or segments, another auction of the new or updated groups may be held 406, the process may continue 408, 409, 410, 412, 414, 416, etc. The method may include additional, fewer, or alternate actions, including those discussed elsewhere herein.

The method 400 may include (e.g., via one or more processors, computing devices, or servers) analyzing insurance customers by their individual characteristics and/or insurance policy preferences 402. In one embodiment, insurance customer characteristics and/or insurance policy preferences (or indications thereof) may be stored in the customer profile database 30, so that each customer profile stored therein includes indications of individual customer characteristics and/or preferences of the respective customer. The analysis of insurance customers may include analysis of customers' insurance policy preferences (with customer permission), such as by insurance coverages, deductibles, and/or limits typically desired or requested by individual customers. For instance, a group of customers may prefer a $500 deductible for homeowner's and/or automobile insurance. Another group of customers may prefer a $1,000 deductible for homeowner's and/or automobile insurance. As another example, groups of customer may prefer to have: $300,000 (or other amounts) of liability coverage for various insurance policies; certain types of coverages and/or insurance; certain levels of deductibles; $250,000, $500,000, or other amounts of coverage for health or life insurance; etc. Additionally or alternatively, the analysis of insurance customers may include analysis of other preferences (again with customer permission), such as a particular characteristic of an insurance company (e.g., rating, web presence, proximity of local agent office, etc.) and/or claims expectations. Thus, groups of similarly minded customers or risk averse insureds may be grouped together based upon similar preferences of insurance parameters and/or terms, and/or similar risk level.

Additionally or alternatively, groups of customers may be grouped together based upon similar customer characteristics. Characteristics that may be analyzed by the one or more processors may include customer risk, risk scores, age, account status (e.g., when a customer is presently insured), marital status, finances or income, education level, occupation, driving history, accident history, geographical location, vehicle type, home type, and/or other individual characteristics of customers. Also, in some embodiments, telematics data associated with a customer's driving behavior may be analyzed (with customer permission) for use in classifying or grouping customers/drivers. One or more processors may access a database and/or customer profiles that are stored in one or more memory units (local and/or remote memory units) to analyze the customer characteristics and/or customer insurance policy preferences, for example.

The method 400 may include (e.g., via the one or more processors, computing devices or servers), dividing, grouping, and/or classifying insurance customers into groups or segments 404. For example, one or more insurance customers, insurance applications, insurance customer accounts, and/or insurance policies may be grouped together or segmented into an insurance policy group, also referred to interchangeably herein as an insurance customer group or an insurance group. Based upon the analysis of customers mentioned above (such as computer analysis of customer characteristics, customer insurance policy preferences, and/or telematics data), the customers may be divided into groups or segments of customers having similar characteristics and/or preferences. For instance, one group or segment of automobile insurance customers may be characterized as (1) low risk drivers or drivers with a risk score within a given range; (2) owners of a certain type of vehicle or vehicles; (3) living within a particular geographical location (e.g., a given state, city, or zip code); (4) having one or more deductible preferences; (5) having one or more coverage preferences; (6) having one or more common characteristics (age, education, marital status, occupation, etc.); (7) having similar driving or accident histories, and/or lack of vehicle accidents; and/or (8) other common factors.

In one embodiment, insurance customer or policy groups may additionally or alternatively be defined by behavioral and attitudinal segmentation and/or customer criteria, such as occupation, risk characteristics, insurance claims expectations, insurance company ratings, and/or telematics data gathered from or associated with customer vehicles or customer driving behavior. Other customer or policy groups or segments may be defined, including those discussed elsewhere herein.

In one embodiment, an indication of each insurance policy group, an indication of the one or more consumers associated with each insurance policy group, and/or an indication of the one or more preferences and/or characteristics that corresponded to the formation of each insurance policy group may be stored. For example, the customer grouping unit 22 may store one or more of said indications in the affinity group database 32.

The method 400 may include (e.g., via the one or more processors, computing devices or servers), auctioning or offering for sale the opportunity to provide insurance for one or more of the insurance customer groups 406. Each group of insurance customers having common characteristics and/or insurance policy preferences may be presented to potential bidders (e.g., to at least some of the plurality of insurance providers 16-1 to 16-N) via an electronic or online auction. For instance, the one or more processors, computing devices or servers may cause a particular insurance group associated with a given group of insurance customers (characterized by customer characteristics, insurance policy preferences, and/or telematics data, for instance) to be presented and/or offered for sale on remote display screens (such as via the internet or a secure communications network) of at least some of the insurance provider systems 16-1 to 16-N. Additionally or alternatively, an indication of the particular insurance group, the given group of insurance customers associated therewith, and/or an indication of the one or more individual preferences and/or characteristics based upon which the group was formed may be provided to the insurance provider systems 16-1 to 16-N, and the insurance provider systems 16-1 to 16-N may generate their respective bids based upon this information.

The method 400 may include (e.g., via the one or more processors, computing devices or servers), receiving and/or comparing one or more bids 408. Bidders for the various groups of similarly situated and/or like-minded insurance customers (such as grouped by low or medium risk drivers, insureds with the same preferences for deductibles or coverages, insureds having similar driving behaviors (as evidenced by telematics data), etc.) may submit their bids via remote computers. The bids may be received by a processor or server associated with the entity running the auction via wireless or wired communication and/or data transmission.

The method 400 may include, via the one or more processors, accepting a respective bid for purchase and/or offer for sale for one or more of the insurance policy groups or groupings 409. For example, an accepted or winning bid may be determined based upon one or more criteria, such as cost, overall match to affinity group members (e.g., based upon customer characteristics, insurance policy preferences, and/or telematics data, for instance), and/or other criteria. In one embodiment, the accepted or winning bid may be determined based upon a prioritization of the one or more criteria. In some cases, upon acceptance of a winning bid, the method 400 may include updating existing insurance policies, rates, premiums, discounts, etc. and/or providing new insurance policies to consumers associated with the affinity group based upon the winning bid. The updates to existing insurance policies and/or the establishment of new insurance policies may provide lower cost insurance to the respective insureds, e.g. to at least some of the consumers associated with the affinity group. Further, the updates to the existing insurance policies and/or the establishment of the new insurance policies may be more reflective of the actual risk (or lack thereof) to at least some respective insureds than were their previous insurance policies (if any). Still further, the updates to the existing insurance policies and/or the establishment of the new insurance policies may be more reflective of the updated or changed preferences and/or the characteristics of at least some of the individual insurance customers associated with the affinity group.

The method 400 may include, via the one or more processors, computing devices or servers, notifying insurance customers of new insurance policies, premiums, rates, discounts, etc. 410 (and/or accepting customer approval or rejection thereof). As previously discussed, after a winning bid has been determined or selected 409, new insurance policies, rates, premiums, discounts, etc. may be determined or updated. New insurance policies and associated information may be communicated to the insureds that may be impacted by the auction, such as notified of reduced premiums and/or increased discounts (such as increased discounts for low risk driving behavior).

The method 400 may include, via the one or more processors, computing devices or servers, automatically detecting driving events or other events that may impact a risk associated with a customer 412, e.g., risk-impacting events. Over time, risk associated with each customer may change. For example, a customer may engage in low risk behavior, and/or may not be involved with automobile accidents, and/or may not report any insurance claims. On the hand, another customer may be involved in a high number of automobile accidents and/or otherwise engage in risky driving behavior. As a result, risk associated with various customers (or risk scores) may be lowered or increased over time based upon data analysis by one or more processors, such as by a processor associated with an insurance provider and with the permission of the insured. For instance, insureds engaging in low-risk behavior may desire for their information to be analyzed by an insurance provider to achieve a discount on various insurance products. The data may be gathered by one or more processors, such as gathered from a customer profile and/or from third party sources, such as a DMV (Department of Motor Vehicles). Additionally or alternatively, the data may be telematics data that is gathered by a mobile device (e.g., smart phone) and/or a conventional telematics device that plugs into an electrical or computer system of a vehicle, or otherwise physically connects to a vehicle.

The method 400 may include, via the one or more processors, computing devices or servers, updating the customer's risk score and/or customer profile 414. Based upon the data gathered and/or collected by one or more processors, each customer's profile, risk profile, and/or risk score may be updated to reflect low or high-risk behavior. Additionally or alternatively, a customer's profile may reflect more recent or changed customer preferences for various insurance policy coverages, deductibles, limits, etc. The customer profile may also be updated to reflect more recent or current customer preferences for various types of insurance or insurance products that the customer may be interested in, such as life or health insurance, or renters versus home insurance. The customer profile may be updated to reflect changed customer characteristics, e.g., changes in address, income, age, etc. As another example, a customer's risk score or profile for automobile insurance may be updated based upon a lack of accidents for a given period of time, and/or involvement in one or more vehicle accidents. The cause of the vehicle accidents may also be factored into the risk score and/or customer profile.

The method 400 may include, via the one or more processors and based upon the updated customer risk score and/or profile, updating the customer group and/or moving the customer to a new group 416. For instance, based upon a customer's updated profile and/or risk score, an individual customer may be moved to or associated with, via one or more processors, a new or different customer group or segment. Additionally or alternatively, based upon a customer's most recent preferences for insurance policy coverages, deductibles, or limits, and/or types of insurance products, an individual customer may be moved or re-assigned to, by the one or more processors, a new or different customer group or segment.

The method 400 may include, via the one or more processors, computing devices or servers, after a number of customers have been moved to new or different risk-based groups, having or holding another auction of the new or updated groups 406, and then the process may continue (as shown in FIG. 3). For instance, after a number of customers have been moved to a new or different group of insurance customers based upon their changed personal characteristics (education, marital status, age, driving record or history, etc.) and/or changed insurance policy preferences (new interest in life or health insurance, new interest in home owners insurance, changed policy deductibles or coverages, interest in using telematics devices and/or gathering telematics data, etc.), a new electronic or online auction of the new, or revised/updated group of insurance policies associated with those insurance customers for which personal characteristics and/or insurance policies have changed may be held, such as under the direction of one or more processors.

V. Exemplary Method of Auctioning Insurance Policies

In one aspect, a computer-implemented method of auctioning groups of insurance policies via an electronic or communications network may be provided. The method may include, after receiving customer permission or affirmative consent: (1) analyzing, via one or more processors, multiple insurance applications, accounts, and/or policies for individual insurance policy preferences and/or individual characteristics of multiple customers or consumers; (2) dividing or segmenting, via the one or more processors, the multiple customers or consumers into various insurance groups, groupings, or segments based upon the individual insurance policy preferences and/or characteristics; (3) auctioning, via the one or more processors, such as via one or more electronic or communications networks, the opportunity to provide insurance for one or more of the various insurance groups or segments; (4) receiving, via the one or more processors, bids for purchase and/or offers of insurance for one or more of the various insurance groups; (5) accepting, via the one or more processors, one of the bids for purchase and/or offers; and/or (6) updating, via the one or more processors, existing insurance policies and/or establishing new insurance policies for at least some of the insureds associated with an insurance policy group corresponding to the accepted bid, thereby providing lower cost insurance and/or insurance more reflective of actual risk, or lack thereof, to the at least some of the insureds. The method may include additional, fewer, or alternate actions, including those discussed elsewhere herein.

For instance, the individual insurance policy preferences may include individual consumer preferences for insurance policy coverages, deductibles, limits, term lengths, and/or other insurance parameters; and the insurance groups or segments each may be associated with automobile, life, health, renters, home, pet, and/or burial insurance. The individual insurance policy preferences may include individual consumer preferences for claims expectations, telematics use, and/or insurance company ratings, in one embodiment.

The individual consumer characteristics may relate to a consumer's age, account and/or policy status, marital status, education, occupation, finances or income, driving history, accident history, vehicle type, home type, geographical location (state or city), risk, risk scores, and/or other individual characteristics. Additionally or alternatively, the consumer characteristics may relate to individual driving behavior that is based upon computer analysis of telematics data. The telematics data may be associated with an individual driver or insured, and/or may be gathered or collected from a mobile device or conventional telematics device that plugs into or otherwise is communicatively connected to an electrical or computer system of a vehicle associated with the individual driver or insured.

The method may further include analyzing for (with customer permission) and detecting an event, or lack thereof, that impacts a risk or risk score of an insured, such as by accessing a third party or government database over a communication network and/or by analyzing telematics data corresponding to the insured. The risk score may be stored, for example, in a consumer profile of the insured. The method may also include (i) updating the consumer profile and/or the risk score of an insured based upon the detected event; (ii) updating the insurance policy group or grouping to which the insured belongs or reassigning the insured to another insurance policy group based upon the updated consumer profile or risk score, and/or (iii) offering for auction the opportunity to provide insurance for the updated or another insurance group.

VI. Exemplary Systems for Auctioning Insurance Policies

In one aspect, a system, e.g., for auctioning insurance policies, may be provided. The system may include one or more persistent memories storing a consumer profile database including a plurality of consumer profiles; one or more communication interfaces to communicate with remote devices via one or more networks; and one or more processors. The system may also include one or more non-transitory, computer-readable or computer-executable media storing instructions thereon. The instructions, when executed by the one or more processors, may cause the system to analyze (with customer permission) stored consumer profiles of multiple insurance consumers to discover or determine consumer insurance policy preferences and/or consumer characteristics. For example, the consumer insurance policy preferences may include individual consumer preferences for insurance policy coverages, insurance policy deductibles, insurance policy limits, claims expectations, telematics use, insurance parameters, and/or insurance company ratings; and the multiple insurance consumers (and their respective applications, accounts, and/or policies) may be associated with automobile, life, health, renters, home, pet, and/or burial insurance. Additionally or alternatively, the consumer characteristics may relate to or be indicative of consumer age, account status, marital status, education, occupation, finances or income, driving history, accident history, vehicle type, home type, location (e.g., state or city), risk, risk scores, and/or other factors. For example, the consumer characteristics may relate to or be indicative of individual driving behavior that is based upon computer analysis of telematics data, where the telematics data may be associated with a particular driver or insured, and the telematics data may be gathered or collected from mobile device or conventional telematics device that plugs into or is otherwise communicatively connected to an electrical or computer system of a vehicle corresponding to the particular driver or insured.

Further, the instructions, when executed by the one or more processors, may cause the system to divide or segment the multiple insurance consumers into various insurance policy groups or groupings based upon the individual/ consumer insurance policy preferences and/or individual/ consumer characteristics; auction (such as via an electronic or communications network using the one or more communication interfaces) the opportunity to provide insurance to consumers included in one or more of the various insurance policy groups or groupings; receive bids for purchase and/or offers for insurance for one or more of the various insurance policy groups or groupings; accept one of the bids for purchase and/or offers for insurance; and/or update insurance policies for at least some of the insureds associated with a particular insurance policy group corresponding to the accepted bid, and/or establish new insurance policies for at least some of the insureds associated with the particular insurance policy group, thereby providing lower cost insurance and/or insurance that is more reflective of actual risk, or lack thereof, to one or more insureds associated with the particular insurance policy group.

In one embodiment, the system may include further instructions stored on the computer-readable or computer-executable media that, when executed by the one or more processors, may cause the system to analyze for (with customer permission) and detect an event (or lack thereof) that impacts a risk score of a particular insured, for example, by accessing a third party or government database over a communication network, and/or by analyzing telematics data. In some cases, the further instructions, when executed, may cause the system to update the risk score of the particular insured and/or update a consumer profile of the particular insured in which the risk score is stored, e.g., based upon the detected event or lack thereof; update, based upon the updated consumer profile or risk score for the particular insured, the insurance policy group or grouping to which the particular insured belongs; and/or offer for auction the opportunity to provide insurance for the insurance policy group or grouping that includes a particular insured with the updated consumer profile or risk score. The system may include additional, fewer, or alternate elements or components, including those discussed elsewhere herein.

In another aspect, a system (e.g., for auctioning insurance policies) may be provided. The system may include one or more persistent memories or data storage devices storing a consumer profile database including a plurality of consumer profiles, and one or more communication interfaces to communicate with remote devices via one or more networks.

The system may include a consumer grouping unit configured to group or segment consumer profiles that are stored in the consumer profile database and that correspond to multiple insurance consumers, applications, accounts, and/ or policies. The grouping or segmenting performed by the consumer grouping unit may be based upon insurance policy preferences and/or consumer characteristics of individual consumers, and one or more insurance policy groups or segments may be formed. For example, the insurance policy preferences may include individual consumer preferences for insurance policy coverages, insurance policy deductibles, insurance policy limits, claims expectations, telematics use, and/or insurance company ratings. The multiple insurance consumers, applications, accounts, and/or policies may be associated with the vehicle, life, health, renters, home, pet, and/or burial insurance. Additionally or alternatively, the consumer characteristics may relate to or may be indicative of consumer age, account or policy status, marital status, education, occupation, finances or income, driving history, accident history, vehicle type, home type, location (e.g., state or city), risk, risk scores, and/or other factors. For example, the consumer characteristics may relate to or may be indicative of individual driving behavior that is based upon computer analysis of telematics data. The telematics data may be associated with an individual driver or insured, and/or may be gathered or collected from a mobile device or conventional telematics device that is plugged into or otherwise communicatively connected to an electronics or computer system of a vehicle corresponding to the individual driver or insured.

The system may include a policy procurement unit that is configured to auction or offer for sale (e.g., by using the one or more communication interfaces and one or more electronic or communications networks) an opportunity to provide insurance for consumers associated with a particular insurance policy group, and/or to cause information about the insurance policy preferences and/or consumer characteristics associated with the consumers associated with the particular insurance policy group to be remotely displayed on one or more computer screens for view by potential bidders (e.g., by using the one or more communication interfaces and one or more electronic or communications networks). The policy procurement unit may further be configured to receive bids for purchase and/or offers of insurance for the particular insurance policy group, accept one of the bids for purchase and/or offers of insurance for particular the insurance policy group, and/or update existing insurance policies and/or establish new insurance policies for insureds associated with the particular insurance policy group, thereby facilitating providing lower cost insurance to at least some of the insureds, and/or providing insurance to at least some of the insureds that is more reflective of (i) actual risk (or lack thereof) of the insureds, (ii) the current insurance policy preferences of the insurance, and/or (iii) the current consumer characteristics of the insurance.

In some embodiments, the system may be further configured to detect (with customer permission) an event (or lack thereof) that may impact a risk score of a particular insured, for example, by accessing a third party or government database over communications network, and/or by analyzing telematics data. Additionally, the system (e.g., the consumer grouping unit and/or other suitable unit) may be configured to (i) update a consumer profile or a risk score of the particular insured based upon the detected event (or lack thereof), and/or (ii) update the insurance policy group or grouping to which the particular insured belongs, where the updating of the insurance policy group or grouping is based upon the updated consumer profile or risk score for the particular insured. Additionally or alternatively, the policy procurement unit (and/or other suitable unit) may be further configured to offer for auction the opportunity to provide insurance for members of the insurance policy group or grouping that includes the particular insured with the updated consumer profile or risk score. The system may include additional, fewer, or alternate elements or components, including those discussed elsewhere herein.

VII. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of automatically obtaining and/or maintaining insurance coverage through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

The invention claimed is:

1. A computer-implemented method for segmenting consumers based at least in part upon telematics data into affinity groups, the method comprising:

analyzing, via one or more processors, multiple insurance applications, accounts, and/or policies for at least one of preferences or characteristics of multiple individuals and/or consumers corresponding to the multiple insurance applications, accounts, and/or policies, wherein the at least one of the preferences or characteristics of the multiple individuals and/or consumers includes a risk score of a particular insured, the risk score stored in a consumer profile of the particular insured;

detecting an event, or lack thereof, that impacts the risk score of the particular insured, wherein detecting the event comprises analyzing, via the one or more processors, telematics data collected by a mobile device of the particular insured and indicative of the particular insured's driving performance;

updating, via the one or more processors, the risk score of the particular insured based on the analyzed telematics data;

dividing or segmenting, via the one or more processors, the multiple individuals and/or consumers into multiple insurance policy groups or segments based upon (i) the at least one of preferences or characteristics of the multiple individuals and/or consumers, and (ii) the updated risk score for each particular insured;

auctioning, via the one or more processors and by using an electronic or communications network, an opportunity to provide insurance for one or more of the multiple insurance policy groups or segments;

receiving, via the one or more processors and the electronic or communications network, one or more bids for purchase and/or offers of insurance for the one or more of the multiple insurance policy groups or segments; and accepting, via the one or more processors, one of the bids for purchase and/or insurance offers for the one or more of the multiple insurance policy groups or segments.

2. The computer-implemented method of claim 1, wherein the at least one of the preferences of the multiple individuals and/or consumers include preferences for at least one of insurance policy coverage, insurance policy deductibles, or insurance policy limits; and wherein the particular insurance policy group or segment is associated with automobile, life, health, renters, home, pet, or burial insurance.

3. The computer-implemented method of claim 1, wherein the preferences of the multiple individuals and/or consumers include preferences for at least one of claims expectations, telematics use, or insurance company ratings.

4. The computer-implemented method of claim 1, wherein the characteristics of the multiple individuals and/or consumers relate to or are indicative of at least one of consumer age, status, marital status, education, occupation, finances or income, driving history, accident history, vehicle type, home type, geographic location, risk, risk scores, or another individual characteristic.

5. The computer-implemented method of claim 1, wherein the characteristics of the multiple individuals and/or consumers relate to or are indicative of individual driving behavior that is based upon computer analysis of the telematics data; and wherein telematics data associated with the particular driver or insured is gathered or collected from a mobile device or from a conventional telematics device that physically connects with a vehicle corresponding to the particular driver or insured.

6. The computer implemented method of claim 1, further comprising:

detecting another event, or lack thereof, that impacts the risk score of the particular insured comprises accessing a third party or government database via the electronic or communications network; and updating, via the one or more processors, the risk score of the particular insured based on data from the third party or government database.

7. The computer-implemented method of claim 1, the method further comprising at least one of:

updating the insurance policy group or segment to which the particular insured belongs based upon the updated risk score or the updated consumer profile of the particular insured; or offering for auction an opportunity to provide insurance for the updated insurance policy group or segment.

8. A system for segmenting consumers based at least in part upon telematics data into affinity groups, comprising:

a persistent memory storing a consumer profile database;

one or more communication interfaces configured to communicate with remote devices via one or more electronic or communications networks;

one or more processors; and one or more non-transitory, computer-readable media storing instructions that, when executed by the one or more processors, cause the system to:

analyze consumer profiles that are included in the consumer profile database and that correspond to multiple insurance consumers for at least one of preferences or characteristics of the multiple insurance consumers, wherein the at least one of the preferences or characteristics of the multiple individuals and/or consumers includes a risk score of a particular insured, the risk score in a consumer profile of the particular insured;

detect an event, or lack thereof, that impacts the risk score of the particular insured, wherein detecting the event comprises analyzing, via the one or more processors, telematics data collected by a mobile device of the particular insured and indicative of the particular insured's driving performance;

update, via the one or more processors, the risk score of the particular insured based on the analyzed telematics data;

divide or segment the multiple insurance consumers into multiple insurance policy groups or groupings based upon (i) the at least one of the preferences or characteristics of the multiple insurance consumers, and (ii) the updated risk score for each particular insured;

auction, via the one or more electronic or communications network and by using the one or more communication interfaces, an opportunity to provide insurance for one or more of the multiple insurance policy groups or groupings;

receive, at the one or more communication interfaces, one or more bids for purchase and/or offers for insurance for the one or more of the multiple insurance policy groups or groupings; and accept one of the bids for purchase and/or offers for insurance for the one or more of the multiple insurance policy groups or groupings.

9. The system of claim 8, wherein:

the preferences of the multiple insurance consumers include individual preferences for at least one of insurance policy coverage, insurance policy deductibles, insurance policy limits, claims expectations, telematics use, or insurance company ratings.

10. The system of claim 8, wherein the particular insurance policy group or grouping is associated with automobile, life, health, renters, home, pet, or burial insurance.

11. The system of claim 8, wherein the characteristics of the multiple insurance consumers relate to or are indicative of each consumer's age;
account status;
marital status;
education;
occupation;
finances or income;
driving history;
accident history;
vehicle type;
home type;
geographical location;
risk score; and/or
individual driving behavior that is based upon computer analysis of the telematics data, wherein the telematics data is associated with the particular driver or insured and is gathered or collected from a mobile device or from a conventional telematics device that connects into a vehicle.

12. The system of claim 8, wherein the one or more non-transitory, computer-readable media stores further instructions that, when executed by the one or more processors, cause the system to:

detect another event, or lack thereof, that impacts the risk score of the particular insured and further, to access a third party or government database via the electronic or communications network; and update the risk score of the particular insured based on data from the third party or government database.

13. The system of claim 8, wherein the one or more non-transitory, computer-readable media stores further instructions that, when executed by the one or more processors, cause the system to at least one of:

update the insurance policy group or grouping to which the particular insured belongs based upon the updated consumer profile or the updated risk score of the particular insured; or offer for auction an opportunity to provide insurance for the insurance policy group or grouping that includes the particular insured with the updated consumer profile or the updated risk score.

14. A system for segmenting consumers based at least in part upon telematics data into affinity groups, comprising:

a persistent memory storing a consumer profile database;

one or more communication interfaces configured to communicate with remote devices via one or more electronic or communications networks;

one or more processors; and one or more non-transitory, computer-readable media storing instructions that, when executed by the one or more processors, cause the system to:

analyze consumer profiles that are included in the consumer profile database and that correspond to multiple insurance consumers for at least one of preferences or characteristics of the multiple insurance consumers, wherein the at least one of preferences or characteristics of the multiple individuals and/or consumers includes a risk score of a particular insured, the risk score stored in a consumer profile of the particular insured;

detect an event, or lack thereof, that impacts the risk score of the particular insured, wherein detecting the event comprises analyzing, via the one or more processors, telematics data collected by a mobile device of the particular insured;

update the risk score of the particular insured based on the analyzed telematics data;

divide or segment the multiple insurance consumers into multiple insurance policy groups or groupings based upon the at least one of the preferences or characteristics of the multiple insurance consumers; and auction, via the one or more electronic or communications network and by using the one or more communication interfaces, an opportunity to provide insurance for one or more of the multiple insurance policy groups or groupings, wherein the preferences of the multiple insurance consumers include individual preferences for at least one of insurance policy coverage, insurance policy deductibles, insurance policy limits, claims expectations, telematics use, or insurance company ratings.

15. The system of claim 14, wherein the system if further configured to update existing insurance policies or provide new insurance policies for insureds associated with a particular insurance policy group or grouping corresponding to the accepted bid, and the particular insurance policy group or grouping is associated with automobile, life, health, renters, home, pet, or burial insurance.

16. The system of claim 14, wherein the characteristics of the multiple insurance consumers relate to or are indicative of each consumer's age;
account status;
marital status;
education;
occupation;
finances or income;
driving history;
accident history;
vehicle type;
home type,
geographical location; and/or
risk score.

17. The system of claim 14, wherein the characteristics of the multiple insurance consumers relate to or are indicative of each consumer's individual driving behavior that is based upon computer analysis of telematics data, wherein the telematics data is associated with a particular driver or insured and is gathered or collected from a mobile device or from a conventional telematics device that connects into a vehicle.

18. The system of claim 14, wherein the one or more non-transitory, computer-readable media stores further instructions that, when executed by the one or more processors, cause the system to (i) detect another event, or lack thereof, that impacts the risk score of the particular insured by accessing a third party or government database via the one or more electronic or communication networks, and (ii) update the risk score of the particular insured based on the data from the third party or government database.

19. The system of claim 14, wherein the one or more non-transitory, computer-readable media stores further instructions that, when executed by the one or more processors, cause the system to at least one of:

update the insurance policy group or grouping to which the particular insured belongs based upon the updated consumer profile or the updated risk score of the particular insured; or offer for auction an opportunity to provide insurance for the insurance policy group or grouping that includes the particular insured with the updated consumer profile or the updated risk score.

* * * * *